Patented Feb. 19, 1946

2,395,115

UNITED STATES PATENT OFFICE 2,395,115

PROCESS OF RECOVERING STEROLS FROM YEAST AND OTHER CELLULAR MATERIAL

Kenneth J. Goering, Ames, Iowa, assignor to Anheuser-Busch, Incorporated, St. Louis, Mo., a corporation of Missouri No Drawing. Application February 4, 1943, Serial No. 474,706

10 Claims. (Cl. 260—397.2)

This invention relates to the recovery of sterols from yeast, fungi and other plant and animal products and more particularly to the recovery of sterols, especially ergosterol, from compressed and brewers' yeast and from sterol-containing material derived from such yeast.

The principal object of the invention is to devise a simple, economical and efficient method of extracting relatively pure sterols from yeast and like material. For present purposes, yeast may be considered to consist of (1) sterols, which are soluble in alcohol and certain other solvents but are not soluble in an alkaline aqueous solution, (2) matter that is soluble readily or fairly readily in an alkaline aqueous solution and (3) matter that is not readily soluble in an alkaline aqueous solution, especially matter which is structurally organized in the form of cell walls or cell substances which are subject to disintegration by prolonged digestion in an alkaline aqueous solution.

The present invention consists principally in treating yeast or like material to eliminate therefrom the matter that is soluble in an alkaline aqueous solution preparatory to extraction of the sterols from the residue. It also consists in digesting the yeast in an alkaline aqueous solution long enough to make the walls of the yeast cells readily permeable but not so long as to effect digestion of the cell substance to such an extent that subsequent filtration becomes difficult or the sterols are suspended in the fluid. It also consists in extracting the sterols from the residue left after eliminating, from the partially digested yeast, the matter that is soluble in an alkaline aqueous solution. It also consists in treating sterol containing cellular material with an aqueous alkaline solution at substantially atmospheric pressure and at a temperature not exceeding the boiling point of the digestion mixture. It also consists in the details, steps and combinations hereinafter described and claimed.

The following is a specific example of my process: 1000 grams of moist yeast, containing 80 per cent moisture, was refluxed for about five hours with 1500 cubic centimeters of an eight per cent solution of sodium hydroxide in water. The mixture was then cooled and filtered. The residue, amounting to 190 grams, containing seventy per cent moisture, contained all the sterols and ergosterol of the original yeast. As a result of a reduction of the bulk and weight of the original material, the ergosterol was concentrated about five times in the moist cellular residue freed from extractives. This residue was extracted once with 1500 cubic centimeters of ninety-five per cent alcohol and then twice more with 1000 cubic centimeters of ninety-five per cent alcohol. These alcoholic extracts were combined and their volume reduced by evaporation to approximately ten per cent of their original combined volume with the result that crystallization of the ergosterol occured readily at room temperature. The theoretical ergosterol content of the yeast used was 2.90 grams. The amount of ergosterol recovered from the first crystallization as described above was 2.76 grams or 95.2 per cent of the theoretical content of the yeast with a purity of 92.5 per cent in terms of pure ergosterol. A recrystallization from alcohol yielded 2.55 grams of pure ergosterol melting at 160 to 162 degrees centigrade or 86.1 per cent of the theoretical ergosterol content of the yeast used. The ergosterol remaining in the residue was less than two per cent of the ergosterol originally present in the yeast.

It is noted that heating of the raw material in an alkaline aqueous solution is a process of partial digestion as well as solution which precedes and is preparatory to the extraction of the sterols and has several objects. In the first place, such treatment is intended to digest the cell walls sufficiently to make them permeable and thereby expose the cell contents to the action of the alkaline aqueous solution in the first instance and to the action of the sterol solvent later on. In the next place, the aqueous alkaline solution is intended to dissolve coloring matter and other extractives so that, by filtration, they can be eliminated in the filtrate before extracting the residue with a sterol solvent. In the third place, it is intended that the digestion of the yeast shall facilitate filtration of the mixture and, for this purpose, it is important that, after the fatty matter is saponified to yield soluble soaps, the digestion shall terminate before excessive disintegration of the cell substances has taken place; for, if the cell substances are disintegrated excessively the sterols will be so thoroughly disseminated throughout the fluid as to involve considerable difficulty or loss in separating and purifying them. In the fourth place, the bulk of the cellular substance is reduced and the sterols are concentrated in the reduced cellular residue to facilitate the handling of solids containing the sterols and to make extraction thereof an economical procedure.

In view of the facts just above stated, it is obvious that the process illustrated by the specific example hereinbefore set forth admits of considerable variation without departing from my invention. For instance, the amount of sodium hydroxide used in said example is approximately the amount required to saponify the fatty content of the amount of yeast specified plus a small allowance for other matter soluble in the aqueous sodium hydroxide solution, and the eight per cent solution thereof affords a suitable quantity of liquid for the heating or refluxing operation. Accordingly, chemically equivalent amounts of potassium hydroxide may be used in place of sodium hydroxide in solution in a quantity of water suitable for refluxing or digesting, as both sodium and potassium hydroxides produce soaps that are soluble in water. Likewise, sodium or potassium carbonate may be used as the alkaline or saponifying agent, as these carbonates are changed into hydroxides under the conditions prevailing in the process. On the other hand, ammonium hydroxide is not suitable for my process because it is volatile at the temperature prevailing therein, and the hydroxides of the alkaline earths are not suitable because the soaps produced by them are insoluble. Accordingly, the term "common alkali metals" is used herein to denote sodium and potassium and exclude ammonium and the alkaline earths as well as the rarer alkali metals.

Similarly, the time of treatment will vary with the temperature at which digestion takes place, but the temperature should not exceed the boiling point of the digestion mixture at a pressure not exceeding atmospheric pressure since temperatures at high pressures disintegrate the cellular material excessively. The temperature of the digestion mixture when boiling will vary with the concentration of the alkali or ingredients used. In the example given above the temperature of the boiling mixture was approximately 101.5° C. However, when under similar conditions the cellular material may consist of an alcoholic residue from another process in which the "moisture" of the residue comprises 50 per cent alcohol, the temperature of the mixture when boiling may be approximately 90° C.

To facilitate storage or handling, the cellular residue obtained as a result of the aqueous alkaline digestion may be dehydrated before extraction of the sterols with a solvent.

Likewise, while I have mentioned ethyl alcohol as the solvent used for extracting sterol from the solid cellular residue, other sterol solvents may be substituted therefor, provided they are inert with relation to the other matter of the residue. Other sterol solvents are ether, acetone, methyl alcohol, ethyl methyl ketone, ethyl acetate, benzol and ethylene dichloride. However, ethyl alcohol has the great advantage of extracting sterol quickly and thoroughly, is relatively cheap, less volatile, and presents a lower fire hazard than other solvents such as ether or acetone. Also, ethyl alcohol yields substantially pure crystals of sterol merely by evaporation of the solvent which is itself easily recoverable for further use.

The process hereinbefore described is applicable to compressed yeast, bakers' yeast, brewers' yeast, sterol-containing material derived from yeast and other cellular sterol-containing material, such as mycelium of molds like Penicillium or Aspergillus, or from animal tissue.

If the sterol containing material is a residue or a by-product of some other process which involves the use of alcohol or other medium in which sterols are soluble, the concentration of that solvent in the aqueous alkaline medium must be reduced so low (less than 50 per cent in the case of yeast cell residue) that the solvent will not interfere with the reduction of the cellular mass to a smaller residue or with a concentration of the sterol in that residue, as otherwise, such alcohol or other sterol solvent would tend to dissolve some of the sterols and thereby cause them to be lost in the filtrate instead of remaining in the residue that is to be extracted with a solvent.

It will be understood by those skilled in the art that the degree of evaporation of the sterol-containing extract, the temperature at which crystallization is initiated and the time allowed for the crystallization of the sterol are so adapted as to facilitate the recovery of a high yield of relatively pure sterol with a minimum number of operations.

The process hereinbefore described has many merits and advantages. It is simple, direct, economical and produces good yields of high quality sterol crystals. It is economical of chemicals by reason of its using only enough alkali to saponify the fatty matter of the yeast and dissolve soluble matter that might otherwise find its way into the alcoholic extract or sterol and complicate the recovery and purification of the sterol. It is also economical by reason of its requiring so little in the way of material and operation subsequent to the preparatory digestion of the yeast and especially because the residue of filtration of the digested mixture is greatly reduced in volume in comparison with the original mixture, and another important advantage is that by terminating the process of digestion after completing saponification but before excessive disintegration of the cell substances, filtration is greatly facilitated and substantially all the sterols are left in the residue.

What I claim is:

1. The improvement in the process of recovering sterols from yeast and like cellular material having saponifiable fats and other impurities therein in a double extraction process which consists in the steps of; first digesting said material at substantially atmospheric pressure with a weak aqueous alkaline solution long enough for said solution to dissolve substantially all the saponifiable and aqueous alkali-soluble material, terminating such digestion before the organic cellular structure of the material is disintegrated, separating the liquid containing soaps and other impurities from the solid residue to form a concentrated solid cellular residue containing all of the sterols originally contained therein with the soaps and other impurities extracted therefrom; and second, extracting said concentrated solid residue with a solvent of sterol and thereafter recovering the sterol from the extract.

2. The improvement in the process of recovering ergosterol from yeast material having saponifiable fats and other impurities therein in a double extraction process which consists in the steps of; first digesting said yeast material at substantially atmospheric pressure with an aqueous alkaline solution long enough for said solution to dissolve substantially all the saponifiable and aqueous alkali-soluble material, terminating such digestion before the organic cellular structure of the material is disintegrated, separating the liquid containing soaps and other impurities from the solid residue to form a concentrated solid cellular residue containing all of the sterols originally contained therein with the soaps and other impurities extracted therefrom; and second, extracting the said concentrated solid residue with an ergosterol solvent and thereafter recovering ergosterol from the extract.

3. The improvement in the process of recovering sterols as described in claim 1 wherein the cellular residue is dehydrated prior to extraction of the sterol with a solvent.

4. The improvement in the process of recovering sterols as set forth in claim 1, the alkaline solution being a solution of sodium hydroxide.

5. The improvement in the process of recovering sterols as set forth in claim 1, the alkaline solution being a solution of potassium hydroxide.

6. The improvement in the process of recovering sterols as set forth in claim 1, the sterol solvent being of the group consisting of ethyl alcohol, ether, acetone, methyl alcohol, ethyl methyl ketone, ethyl acetate, benzol and ethylene dichloride.

7. The improvement in the process of recovering sterols as set forth in claim 1, the sterol solvent being ethyl alcohol.

8. The improvement in the process of recovering sterols as set forth in claim 1, the sterol solvent being ethyl acetate.

9. The improvement in the process of recovering sterols as set forth in claim 1, the sterol solvent being methyl alcohol.

10. The process of recovering sterols from yeast and other cellular material containing sterols, saponifiable fats and other impurities therein in a double extraction process which consists in the steps of; first subjecting such material to the action of an aqueous solution of sodium hydroxide at substantially atmospheric pressure to saponify the saponifiable matter into soluble soap and dissolve the matter that is soluble in such sodium hydroxide solution, terminating such action before the organic cellular structure of the material is disintegrated, separating the liquid containing such saponified and dissolved matter from the solid residue to form a concentrated solid cellular residue containing all of the sterols originally contained therein with the soaps and other matter soluble in sodium hydroxide extracted therefrom; and second, extracting the concentrated solid residue with ethyl alcohol and thereafter recovering sterol from the extract.

KENNETH J. GOERING.